148-23 SR
12/16/86 JR RE 32,309

United States Patent [19]
Hwang

[11] E Patent Number: Re. 32,309
[45] Reissued Date of Patent: Dec. 16, 1986

[54] FUSIBLE POWDERED METAL PASTE

[75] Inventor: Jennie S. Hwang, Pepper Pike, Ohio

[73] Assignee: SCM Corporation, New York, N.Y.

[21] Appl. No.: 822,475

[22] Filed: Jan. 27, 1986

Related U.S. Patent Documents

Reissue of:
[64] Patent No.: 4,557,767
Issued: Dec. 10, 1985
Appl. No.: 649,493
Filed: Sep. 11, 1984

U.S. Applications:
[63] Continuation-in-part of Ser. No. 546,794, Oct. 31, 1983, abandoned.

[51] Int. Cl.[4] ..... B23K 35/34
[52] U.S. Cl. ..... 148/23; 148/24; 148/25; 148/26
[58] Field of Search ..... 148/23-26

[56] References Cited

U.S. PATENT DOCUMENTS

| | | | |
|---|---|---|---|
| 592,914 | 11/1897 | Knox | 148/25 |
| 608,973 | 8/1898 | Burnley | 148/25 |
| 804,664 | 11/1905 | Leisel | 148/25 |
| 851,813 | 4/1907 | Lanigan | 148/25 |
| 1,004,847 | 10/1911 | Brach | 148/25 |
| 1,772,952 | 8/1930 | Knoth | 148/25 |
| 2,330,904 | 10/1943 | Miller | 148/25 |
| 2,493,372 | 1/1950 | Williams | 148/24 |
| 3,065,538 | 11/1962 | Melchiors et al. | 29/496 |
| 3,073,270 | 1/1963 | Johnson et al. | 113/110 |
| 3,925,112 | 12/1975 | Petersen et al. | 148/25 |
| 3,954,494 | 5/1976 | Stayner et al. | 148/25 |
| 4,180,616 | 12/1979 | Lovering et al. | 148/25 |
| 4,273,593 | 6/1981 | Mastrangelo | 148/25 |
| 4,460,414 | 7/1984 | Hwang | 148/23 |

FOREIGN PATENT DOCUMENTS 1513203 1/1968 France .

OTHER PUBLICATIONS

"Technology of Electronic Grade Solder Paste", Taylor et al, Solid State Technology, Sep. 1981, pp. 127-135.

*Primary Examiner*—Peter. D. Rosenberg
*Attorney, Agent, or Firm*—R. A. Sturges

[57] ABSTRACT

There is provided an inorganic salt-free, anhydrous, noncorrosive powdered solder metal paste and vehicle therefor which vehicle is characterized by the presence therein of a flux and a nonaqueous organic liquid having a surface tension or surface energy of from 43 to 65 dynes/cm. and higher at 20°C. When powdered solder metal or powdered solder metal alloy is distributed in such a vehicle in an amount sufficient to form a paste, a deposit will not undergo hot slump at elevated temperatures. The pastes and vehicles are free of inorganic metal salts.

57 Claims, No Drawings

FUSIBLE POWDERED METAL PASTE

Matter enclosed in heavy brackets [ ] appears in the original patent but forms no part of this reissue specification; matter printed in italics indicates the additions made by reissue.

RELATED APPLICATION

This application is a continuation-in-part of my copending application Ser. No. 546,794 filed Oct. 31, 1983 now abandoned.

This invention relates to a paste vehicle and a heat-fusible metal powder. The vehicle is especially useful for making noncorrosive metalliferous pastes for joining by soft soldering.

BACKGROUND OF THE INVENTION AND PRIOR ART

The joining or coating, using a fusible soft solder metal powder-containing paste can be done efficiently, provided, however, that upon heating and before fusion of the metal, the soft solder metal powder containing paste exhibits controlled hot slump; in other words, the metal powder stays substantially where and as the paste was deposited on the substrate. This primary property has been difficult to obtain with conventional metal powder-containing pastes. The instant vehicles and pastes provide such property.

Restriction of flow of any resulting fused metal (that is a lack of general spreading), except into intended joints or to form intended joints as in the joining of electronic components to printed circuit boards or hybrid circuit board to avoid bridging in surface mounted device attachments, are other properties desired. The inventive products here can also provide desired restriction of metal flow on remelting. For most electronic soldering purposes at this time, the composition must be free of corrosive agents such as inorganic salts.

Soft solder pastes, for example, (melting below 400° C., preferably below 330° C.) usually contain tin and lead; a little silver often is alloyed with the tin, particularly for electronic work, e.g., for making microelectronic connections. Soft solder pastes now are experiencing wider acceptance in industry, primarily because pastes are more readily adapted to automated manufacture and screen-printing on a substrate than are the more conventional and manually effected solder bar, separate flux and iron, or solder wire (e.g., one containing the flux in a core within the wire) and an iron. The make-up of prior powder metal-containing paste compositions has been largely influenced by the prior practices particularly in respect of fluxing or surface preparing agents. These have comprised substantial portions of organic acids, e.g., rosin acid, inorganic salt materials, e.g., zinc chloride, ammonium chloride, borax and the like, and rosin-based fluxes.

These soft solder compositions have not been entirely satisfactory in a number of respects. First, because of the presence of inorganic salt fluxes they have tended to be corrosive to the base metal or to introduce water as water of hydration leading to spattering. This problem was alleviated to a great extent with rosin-based flux vehicles. However the rosin-based fluxes or vehicles permit excessive movement of the solder particles away from the deposition site on heating; they also often give rise to sputtering and "dewetting" which leaves a residue as a halo around the solder joint. Their solder pastes have been prone to excessive solder balling, i.e., the formation of discrete minute balls of soft solder. This is highly undesirable and leads to electrical bridging across what should be electrically isolated connections especially on printed circuit boards.

In the preferred embodiment of a soft solder composition an alkali solubilized in a polyhydric alcohol, e.g., glycerine, acts as a fluxing agent and improves solderability. For best results herein, in a soft solder metal powder, a slump control system and an inorganic salt-free fluxing system are present. The compositions hereof are practically noncorrosive and easy to formulate and handle. They are readily adaptable to screen printing. Disadvantages attendant prior compositions, such as spattering due to evolution of water vapor, solder balling and bridging, corrosivity, dewetting, tenacious residue, failure of the solder to melt due to excessive oxidation, etc., are not observed in the metal-bearing pastes here. "Inorganic metal salts" are metal or ammonium salts of inorganic acids Lange's "Handbook of Chemistry", 10th Edition, pp. 209–333.

To better understand the applications of solder pastes, reference may be had to "Technology of Electronic Grade Solder Pastes" Taylor et al, Solid State Technology, September 1981, pages 127–135.

One prior paste composition is disclosed by Knoth U.S. Pat. No. 1,772,952. This paste comprises a solder metal powder, an amine and a binder or vehicle such as vaseline. These compositions do not, however, possess antislump properties which are currently in demand in the electronics industry. U.S. Pat. No. 2,493,372 to Williams dated Jan. 3, 1950 discloses a paste composition including a metal powder, e.g., tin-lead, a salt flux, and a C, H and O compound. Reference may also be had to U.S. Pat. No. 3,954,494 dated May 4, 1976 which discloses a wax-flux composition. U.S. Pat. No. 804,664 also shows a tin-lead metal powder paste in a vaseline—glycerine—inorganic salt flux system.

Another solder paste composition comprising powdered solder, a resin, a salt of an amino acid ester and a solvent is discussed by Melchiors et al in U.S. Pat. No. 3,065,538 dated Nov. 27, 1962.

Another aqueous base solder composition is shown by Johnson in U.S. Pat. No: 3,073,270 dated Jan. 15, 1963.

Also exemplary of prior solder paste compositions is the patent to Petersen et al U.S. Pat. No. 3,925,112 dated Dec. 9, 1975. According this invention, there are provided emulsified self-cleaning soldering fluxes having an aqueous phase including from 2 to 3 pbw (parts by weight) of a water soluble hydrazine salt and an oil phase including from 5 to 50 parts of a mixture of petrolatum and wax. Also provided are water solutions of 2 to 30 pbw of the water soluble hydrazine salt, up to 5 parts of a vegetable gum thickener, a wetting agent and the balance water.

Another prior paste composition is disclosed by Mastrangelo in U.S. Pat. No. 4,273,593 dated June 16, 1981. This paste comprises a solder metal powder and a vehicle, the latter being a hydroxypropyl cellulose blended with glycerine and/or water and further blended with a mixture of polyalkoxyalkanols.

It has now been found that an improved vehicle for the instant powdered metal solder pastes is provided as an essentially inorganic salt free nonaqueous vehicle medium comprising a normally liquid nonaqueous organic liquid as an antislump agent, usually and preferably a polyhydric alcohol system, characterized in that the liquid has a minimum surface tension of 43 dynes/cm (20° C.), and generally from 43 to 65 or higher dynes/cm. Such system provides a slump control property to the metal bearing paste such that when it is heated toward the melting point of the soft solder metal powder, e.g., 118° C. to 325° C., the shape of the deposit is substantially maintained until the metal fuses. Although as will be seen from Table I below, and nonaqueous liquid having a surface tension above 43 dynes/cm. may be used in the vehicles hereof, polyols are the most practical antislump materials and the invention will be described with reference to polyols for convenience.

These vehicles also desirably include a low surface energy material such as a hydrocarbon. The hydrocarbon, which is preferably solid or semi-solid (e.g., grease-like) melts, of course, and wets the substrate around the deposit, but carries no significant amount of the metal particles with it. Although hydrocarbons having melting points above 15° C. are preferred, in certain embodiments normally liquid hydrocarbons such as hexane, cyclohexane, toluene or mixtures thereof, e.g., mineral spirits, may be used. The high surface energy material serves as a binder under heat conditions to hold the particles in position. Also the hydrocarbon is easily cleaned, along with any residue that may be left, away from the joint or surrounding area. The hydrocarbon by itself is incapable of imparting slump control properties to a powdered metal contained therein. In the preferred powdered metal compositions especially adapted for screen printing, no dewetting is observed. Surprisingly, even after melting, the fusible metal resists running from the site of application. Of course, in soft solder compositions there is also need for a fluxing agent. Such agent serves to clean the surfaces of the substrate or joining metal as well as the solder particles, and to inhibit the formation of oxide coating on the solder particles as the temperature is elevated toward melting.

The desirable properties of antislump, anticorrosion and freedom from spattering in the metal-bearing pastes here are not observed in prior compositions known to me. Other additives may desirably be present as will be pointed out below. The instant pastes have no water in them other than insignificant amounts possibly present as an adventitious impurity that might be associated with good quality technical grade ingredients. No water is added deliberately as such or as a hydrate; so it can be said that the instant pastes and vehicles are "nonaqueous" as a practical matter. Also, it has been found that the high surface tension liquid, e.g., a polyol, can be a single component vehicle or a part of a multicomponent vehicle, i.e., including also a hydrocarbon. The substrate on which the paste is deposited has no significant effect on the hot slump resistance.

BRIEF STATEMENT OF THE INVENTION

Briefly stated, the present invention is a nonaqueous or anhydrous inorganic salt-free, powdered solder metal paste composition comprising a major amount of a soft solder metal powder and a minor amount of a paste vehicle containing a noncorrosive anhydrous fluxing agent, and an antislump composition including a nonaqueous liquid having a surface tension above 43 dynes/cm. at 20° C. and preferably a polyol containing from 2 to 6 hydroxyl groups and having a surface energy of from 43 to 65 or higher dynes/cm. (20° C.). Preferably these pastes also include a paste forming vehicle ingredient which is a hydrocarbon.

To further extend the utility of the soft solder alloys, there may be added other ingredients, such as, one or more surfactants, one or more condensed or fused ring aliphatic acids, e.g., cholic acid or abietic acid or rosin acids, and one or more plasticizers such as di-n-butyl phthalate. The pastes including a powdered soft solder alloy form a shiny and coherent (i.e. coalesced) solder pool in a controlled area of application.

DETAILED DESCRIPTION OF THE INVENTION

It has been found that slumping of a paste composition containing a major amount of a powdered soft solder metal or soft solder metal alloy can be effectively controlled by a unique composition composed of a hydrocarbon or a mixture of hydrocarbons, e.g., petrolatum, and a polyhydric material, e.g., glycerine and sodium hydroxide. The combination of a hydrocarbon having a melting point of at least 15° C. and less than the melting point of the metal, and a polyhydric alcohol, such as di- or triethanolamine, or glycerine, or pentaerythritol, or the like, is however, effective in maintaining quite substantially the profile of the paste as it was initially deposited on the surface or substrate. A solder paste requires, however, a flux. At the fusion point, the metal in the present compositions has not run or spattered or balled up into small discrete balls of molten metal prior to the fusion of the entire mass. A polyhydric alcohol or polyol alone also is capable of conferring this property upon a paste composition containing a major amount of a metal or a metal alloy. However, the composition is unsatisfactory as a soft solder composition, requiring also a suitable hydrocarbon diluent and a noncorrosive flux.

To form a solder paste, the vehicle portion hereof are blended with a powdered solder alloy to the extent of from 75% to about 93% metal by weight of the paste, and desirably from 80% to 90%, and preferably about 85% powdered metal. The particle size of the powdered metal is desirably such that it will not settle out of the vehicle which is quite viscous (20,000 to 200,000 cps., Brookfield No. 7 spindle at 20 rpm) on standing. In general, the particle size is less than 100 mesh (U.S. Standard Sieve Size), desirably −200+400 mesh. A mixture of various sizes and/or shapes of metal powders often is advantageous for achieving desired rheology and other paste properties in these applications. Solder powder particles are available in two forms, i.e., those having irregular shape and those having spherical shape. Either shape, or a mixture thereof maybe used, although the spherical shape is desired. Example 131 below is the best mode presently known to me of practicing my invention. Where normally liquid hydrocarbon diluents are used, e.g., toluene, the particle size of the solder powder should be less than about 10 microns in order to minimize settling.

Preparation of the vehicle and paste is achieved with conventional stirring or blending means. Warming can be done, if necessary or desired, to facilitate by dissolving or melting ingredients together for putting them into very intimately dispersed condition and/or otherwise making a multiphase dispersion with the ingredients in a very fine state of subdivision preparatory to blending with the metalliferous powder to form a mass of paste consistency. Preferred compositions include additional fluxing agents, optionally a surfactant, optionally an organic carboxylic acid, and optionally a diluent; i.e., a plasticizer and/or solvent. Each of these ingredients will be discussed below. Thereafter, the solder alloys will be discussed followed by general processing techniques, and specific examples.

THE HYDROCARBON INGREDIENT

Hydrocarbons are preferred ingredients for the metal paste compositions thereof. Fluorinated hydrocarbons or chlorofluorinated hydrocarbons may be used to replace part or all of the hydrocarbon. The useful materials range in melting point from below about room temperature to normally solid materials, e.g., petroleum hydrocarbon waxes containing from 18 to 60 or more carbons and melting in the range of 28° C. to 100° C. The useful hydrocarbons also have a very low ash or solid residue content and either melt and flow, sublime and/or thermally decompose at a temperature below the melting point of the solder (i.e., below 330° C.). The amount of ash or solid residue from the hydrocarbon remaining of the melt temperature should be less than 0.5% and preferably less than 0.1%. The useful hydrocarbons may be paraffinic, aromatic, or mixed aromatic paraffinic or mixtures of compounds of such characteristics, and include various mixtures of hydrocarbons, e.g., octadecane, mineral spirits, paraffin wax, and petrolatum, e.g., Vaseline. Synthetic hydrocarbons normally solid or semi-solid include commercially available polyethylenes, polypropylenes, poly(ethylene-propylene), polybutenes, poly(ethylenestyrene), hydrogenated nonpolar polymeric hydrocarbons having Ring and Ball softening points of from 15° C. to 130° C., such polymers having a molecular weight less than about 1500 and preferably less than 1000, hydrogenated polyterpenes, etc. The best material known to me for use herein is petrolatum. Halogen substituted hydrocarbons e.g., fluorocarbons and chlorofluoro carbons may also be used, they also being relatively inert at the temperatures encountered.

"Petrolatum" is a well known colloidal system of nonstraight-chain solid paraffinic hydrocarbons and high boiling liquid paraffinic hydrocarbons, in which most of the liquid hydrocarbons are held inside the micilles. A detailed historical account including the chemistry of petrolatum and modern manufacturing methods is found in Drug and Cosmetic Industry, Vol. 89, 36–37, 76, 78–80, and 82, July 1961. "Petrolatum for Drugs and Cosmetics" Schindler. Petrolatum is typically a yellowish to amber or white semisolid, unctuous mass, practically odorless and tasteless. It has a density at 25° C. of from 0.820 to 0.865, a melting point of 38° to 54° C., and a refractive index $\eta 60.0$ of 1.460–1.474. It is readily commercially available under the well known proprietary marks Vaseline, Cosmoline, Stanolene, Penreco brand petroleum jelly as well as other convenient trade designations. Petrolatum may be used in its commercially available form or it may be modified by the addition of petroleum wax or paraffin wax in particulate form, e.g., microcrystalline wax.

The hydrocarbon ingredient is utilized in an amount which ranges from 10 to 90 pbw of the vehicle system, or 0.7% to 22.5% of the solder paste. A nonaqueous organic liquid having a surface energy in the range of 43 to 65 or higher dynes/cm appears to be essential for the slump control characteristics of the present powdered metal pastes. Although water has a high surface energy as does sulfuric acid, these materials are not satisfactory because of spattering or reactivity at elevated temperatures.

SLUMP CONTROL SYSTEM

As indicated above, the ability of a soft solder paste to resist hot slump, or running during softening and melting is essential in modern microelectronic processing and particularly silk and stencil screening of soft solder pastes. It has been found that a combination of a hydrocarbon as above defined and particularly petrolatum, and a nonaqueous organic liquid having a surface tension at 20° C. greater than 43 dynes/cm., and preferably one or more polyhydric alcohols containing 2 to 6 OH groups and having a surface tension or energy of from 43 to 65 or higher dynes/cm at 20° C., is effective in providing a good paste and in preventing slumping of the metal particles. The hydrocarbon alone with powdered soft solder composition appears incapable of conferring this property to any degree. Nonaqueous organic liquid alone gives sufficient antislump properties but sometimes insufficient soldering properties. Soft solder pastes also require a flux and to obtain the noncorrosiveness required in modern electronic applications the flux should not be an inorganic salt, e.g., $ZnCl_2$, $NH_4Cl$, or borax, this latter being highly hydrated and thus given to spattering.

The antislump agents hereof are generally polar compounds.

Table I below gives specific examples of liquids of various kinds useful in inhibiting slump. The polyols useful herein are aliphatic and normally liquid or of relatively low melting point, i.e., below about 170° C. and include ethylene glycol, diethylene glycol, propylene glycol, dipropylene glycol, sorbitol, mannitol, trimethylolethane, trimethylolpropane, diethanolamine, triethanolamine, pentaerythritol, and erythritol. These polyols coact with a hydrocarbon, especially petrolatum in the absence of water and in the presence of a finely divided metal powder to control slumping on heating and to provide a satisfactory paste medium. A fluxing agent either as a separate ingredient, e.g., sodium hydroxide, or as a moiety of the polyol (e.g., triethanolamine or diethanolamine) must be present. The secondary or tertiary amine group appears to be suitable for fluxing. The polyol is generally insoluble in the hydrocarbon. The amount of liquid polyol constitutes from about 0.5% to 10.0% by weight of the vehicle and powdered solder metal composition.

A comparative study of various agents in 88.9% powdered metal compositions demonstrates the significance of the limitation respecting surface energy or surface tension.

TABLE I

Slump/Resistance Study (For 60% Sn; 40% Pb Powdered Metal)*

| Surface Tension (Dyne/Cm) | Antislump Agent | Slump Resistance | Remarks |
|---|---|---|---|
| 63.4 | 7% NaOH/93% Glycerine | Yes | Fluxing occurred |
| 63.4 | Glycerine | Yes | No fluxing |
| 58.2 | Formamide | Yes | Little fluxing occurred |
| 55.1 | Conc $H_2SO_4$ | Yes | Oxidizing occurred |
| 50.8 | Methylene Iodide | Yes | P/M turned green |
| 48.4 | Triethanolamine | Yes | Fluxing occurred |
| 48.5 | Diethanolamine | Yes | Fluxing occurred |
| 48.3 | Monoethanolamine | Yes | |
| 47.7 | Ethylene Glycol | Yes | Little fluxing |

TABLE I-continued

Slump/Resistance Study (For 60% Sn; 40% Pb Powdered Metal)*

| Surface Tension (Dyne/Cm) | Antislump Agent | Slump Resistance | Remarks |
|---|---|---|---|
| | | | occurred |
| 45.2 | Triethylene Glycol | Yes | Little fluxing occurred |
| 44.0 | Tetraethylene Glycol | Yes | Little fluxing occurred |
| 44.5 | Polyethylene Glycol 200 | Yes | Little fluxing occurred |
| 44.5 | Polyethylene Glycol 600 | Yes | Little fluxing occurred |
| 42.9 | Aniline | No | |
| 40.9 | Phenol | No | Solid Chemical |
| 38.0 | Pyridine | No | |
| 36.8 | Nitromethane | No | |
| 32.7 | Acetic anhydride | No | Oxidizing occurred |
| 32.5 | Oleic acid | No | |
| 32.3 | Carbon Disulfide | No | |
| 27.8 | Acetic acid | No | Oxidizing occurred |
| 27.5 | n-Octyl alcohol | No | |
| 25.5 | Cyclohexane | No | |
| 24.2 | Ethyl bromide | No | |
| 23.0 | i-Butyl alcohol | No | |
| 20.7 | t-Butyl alcohol | No | |
| — | Vaseline | No | |

*NOTE:
1. Formula used for slump resistance studies: 88.9%(97.5% Pb; 1.0% Sn; 1.5% Ag) + 7.8% Vaseline + 3.3% Antislump agent.
Paste was examined on Cu coupon at designated temperature.

Table II below shows the hot slump effect on a solder composition using the "antislump agent" as the sole vehicle.

TABLE II

Slump/Resistance Study (60% Sn; 40% Pb/Single Phase Vehicle System)

| Surface Tension (Dyne/Cm) | Antislump Agent | Slump Resistance | Remarks |
|---|---|---|---|
| 63.4 | 7% NaOH/93% Glycerine | Yes | Excellent Soldering |
| 63.4 | Glycerine | Yes | Oxidizing |
| 55.1 | Conc $H_2SO_4$ | Yes | Occurred |
| 50.8 | $CH_2I_2$ | Yes | Solid |
| 48.9 | Triethanolamine | Yes | Chemical |
| 47.7 | Ethylene Glycol | Yes | |
| 40.9 | Phenol | No | |
| 38.0 | Pyridine | — | P/M ppt'd quickly |
| 27.5 | n-Octyl alcohol | — | P/M ppt'd quickly |
| — | Vaseline | No | |

Note:
1. Paste was examined on Cu coupon at 235° C.
2. The vehicle NaOH/glycerine also provided good slump resistance for Nordox Red Cuprous. ($Cu_2O$).

Table III below shows the effect of temperature on hot slump resistance with selected polyols and other additives.

TABLE III

Slump/Resistance Study (Temp. Effect)

| Surface Tension (Dyne/Cm) | Antislump Agent | Temp. (°C.) at Test | Slump Resistance |
|---|---|---|---|
| 48.9 | Triethanolamine | 150 | Yes |
| | | 235 | Yes |
| | | 325 | Yes |
| 44.5 | Polyethylene Glycol 200 | 150 | Yes |
| | | 235 | Yes |
| | | 325 | Yes |
| 42.9 | Aniline | 150 | No |
| | | 235 | No |

TABLE III-continued

Slump/Resistance Study (Temp. Effect)

| Surface Tension (Dyne/Cm) | Antislump Agent | Temp. (°C.) at Test | Slump Resistance |
|---|---|---|---|
| | | 325 | No |
| 38.0 | Pyridine | 150 | No |
| | | 235 | No |
| | | 325 | No |

Note:
1. Formula used for slump resistance studies: 88.9%(97.5% Pb; 1.0% Sn; 1.5% Ag) + 7.8% Vaseline + 3.3% Antislump agent.
Paste was examined on Cu coupon at designated temperature.
2. When the paste was examined on substrate which has been surface treated with FC-723* (surface tension 11 dyne/cm), the slump resistance behavior was still about the same as that on the Cu coupon.
*Fluorad FC-723 is an oleophilic, hydrophilic fluorocarbon in an inert vehicle having a specific gravity of 1.78 produced by 3M.

FLUXING SYSTEM

As indicated above, there must be present a noncorrosive anhydrous fluxing system in a solder paste composition hereof. The fluxing system may be a single chemical specie dissolved or dispersed in the hydrocarbon/polyol system. Alternatively, the fluxing system may comprise a plurality of fluxing agents dissolved or dispersed in the hydrocarbon/polyol system. Best results have been secured with alkali or basic reacting fluxing agents, and particularly alkali metal hydroxides. These can be used as solutions in the polyol or as alcoholates of a monohydric or polyhydric alcohol, e.g., methyl, ethyl or isopropyl alcohol, dissolved in the polyol, or the alkali metal salt of the polyol, e.g., sodium glycerate.

The alkali metal hydroxide in such component is a preferred noncorrosive fluxing agent and is effective in a proportion of about 0.1–5% by weight of the vehicle, and, advantageously, 0.25–3.5%. The liquid polyol can constitute from about 0.5 to 75.0% by weight of the vehicle, and, advantageously, about 40%. On the basis of the entire solder paste, the amount of polyol ranges from about 0.3 to 18.8%. The alkali metal hydroxides useful herein include in descending order of preference sodium hydroxide, potassium hydroxide, lithium hydroxide and cesium hydroxide. Such alkali metal hydroxides have a limited solubility in polyhydric alcohols or mixtures of same that are liquid and are conveniently used in concentrations at or near the limit of solubility, i.e., less than about 10% by weight of the polyol. As indicated, they can be present as an alkali metal alcoholate, e.g., sodium ethylate, dissolved or well dispersed in the polyol, the alcoholate being equivalent to the hydroxide. The polyhydric alcohols include glycerine (which is preferred), ethylene glycol, diethylene glycol, propylene glycol, sorbitol, mannitol, pentaerythritol, erythritol, etc., containing from 2 to 6 OH groups. A sodium hydroxide/glycerine solution is particularly effective and may be used as the sole fluxing agent, or it may be used in combination with an alkanolamine, e.g., triethanolamine or diethanolamine to provide effective fluxing systems for the instant pastes.

A useful fluxing ingredient is also provided as an amine component of the vehicle. Such component is effective in a broad proportion, e.g., about 2–40% by weight of the vehicle and, advantageously 3–10%. The essential functional group of this component is an

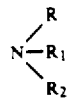

wherein R, $R_1$, and $R_2$ are independently selected from hydrogen, alkyl, alkylene, cycloalkyl, cycloalkylene, carboxyalkylene, aminoalkylene, hydroxyalkylene, carboxyalkyl, etc., no more than two of R, $R_1$ and $R_2$ being hydrogen. The alkyl and cycloalkyl groups may contain from 1 to 30 carbon atoms. The amine component may contain one to three amino groups. A particularly useful group of amine compounds is the water soluble alkanolamine group including mono-, di, and trimethanolamines, mono-, di-, and triethanolamines; mono-, di-, and tripropanolamines, and mixtures of the mono-, di-, and trialkanolamines. Alkyl and cycloalkyl amines, particularly the $C_2$–$C_{18}$ mono and polyamines, e.g., triethylamine, tri-isopropylene, diethylamine, mono-n-butyl amine, propylene diamine cyclohexylamine, cyclopropyl methylamine, tetramethylene diamine, rosin amine, cyclohexylamine hydrochloride, cyclohexylene amine, diaminoethylamine, diaminopropylamine, etc. Thus, the kind and configuration of the amino compounds useful herein are very broad and results among the examples are reasonably equivalent for fluxing. Amidino and guanidino fluxing agents, advantageously aliphatic ones, can be considered as useful amines for the instant purpose. Aromatic amines, while functional, often impart toxicity and therefore are not favored. Similarly, pyridine-type materials, such as, pyridine or a lutedine give off intensely objectionable odors and are not favored, but could be considered functioning like amines here. The preferred amines are the alkanolamines. Also useful to supplement the base system are the amino acids, particularly the water soluble amino-acids, e.g., aminoacetic acid, beta-aminopropionic acid, (beta-alanine)aminobutyric acids, epsilon-aminocaproic acid, N-methyl glycine, betaine, alpha-delta-diaminovaleric aliphatic carboxylic acids. Thus, urea, propionamide, butanamide, 2,2-dimethylpropionamide, N-methylpropionamide, N,N-beta-trimethylbutyramide, steroylamide, etc., can be such base system supplements.

OTHER FLUXING AND/OR SOLDERABILITY INGREDIENTS

Organic carboxylic acids are useful as fluxing and/or solderability ingredients, particularly in a supplemental role in combination with the other ingredients described above. Any high boiling (above 300° C.) aliphatic carboxylic acid may be used. I prefer, however, to use condensed ring acids such as abietic acid, cholic acid, rosin acids, polymerized rosin acids, hydrogenated rosin acids rosin esters disproportionated rosin ester gum, wood rosin, gum rosin, tall oil rosin, or fatty acids such as stearic acid, oleic acid, etc. Fatty amine and fatty acid compounds are also useful in this capacity. Examples include N-tallow-1,3-diaminopropane, 3-diaminopropane dioleate, etc. The acids are used in small amounts of from 0.5 to 10% by weight of the vehicle composition, or on the basis of the fully formulated solder paste, from about 0.03% to about 2.5%.

It has also been found that a surfactant may be advantageously included in the vehicles hereof. Although such surfactant or wetting agent may be anionic, cationic, amphoteric, or nonionic, nonionic agents are preferred. Many surfactant materials are known. They are used in the present vehicles to help to control the rheological properties, shelf-life stability, air voids, etc. The amount used is determined by cut and try and is that amount which is sufficient to impart the desired control. These agents assist in the dispersion of the powdered metal and in carrying the fluxing agent to the surfaces being joined or coated. Generally less than 10% by weight each of other ingredients is used and usually from 0.01% to 5% by weight of the vehicle or 0.001% to about 4.5% of the solder paste.

Specific surfactants include the alkylarylpolyether alcohols, ammonium perfluorinated carboxylates, fluorinated alkyl esters of fatty acids, acetylenic glycols (which as sometimes can act as a defoamer), polyoxyethylene sorbitan monostearate, etc. Surfactants commonly used in solder monostearate, etc. Surfactants commonly used in solder pastes may be used herein.

Solvents and/or diluents may also be present in the vehicle compositions hereof. For example, when a paste containing powdered solder metal is to be used in a screen printing process, solvents are conveniently used to adjust the viscosity to a satisfactory level. Solvent materials are desirably volatile, at least at the melting point of the solder alloy. Any solvent including low molecular weight alcohols, e.g., ethyl or propyl, isopropyl, butyl, amyl, cyclohexyl, terpene alcohols, etc.; ketones; e.g., methyl ethyl ketone, methyl isobutyl ketone; 2-butoxyethanol-1, ethylene glycol dimethyl sulfoxide, hydrocarbons, e.g., kerosene, terpene hydrocarbons, hexane, cyclohexane, heptane, octane, naphthas such as mineral spirits, ethyl acetate, amyl acetate, etc. The solvent ingredients may also include higher boiling materials commonly regarded as plasticizers such as dibutyl phthalate, tricresyl phosphate, etc.

The selection of the solvent and/or diluent is controlled by the end use, cost, environmental factors, desired plasticity, etc. The solvent or diluent may be water soluble or substantially water insoluble. The solvent or diluent leaves the system after application to a substrate as in screen printing, the residue being the solder paste composition hereof.

Minor amounts of known odorants, bactericides, fungicides, etc., may also be included in the vehicles hereof if desired. Amounts of such ingredients usually range from about 0.1 to 2% by weight of the vehicle.

PREPARATION OF THE VEHICLES

The simplest preparation of the vehicles hereof involves only effective mechanical mixing of the ingredients into the petroleum hydrocarbon ingredient, e.g., petrolatum.

The hydrocarbon can, if desired or necessary, be heated to melt it and facilitate the blending operation, and warming of some of the other ingredients also can be of help. If it not necessary that the mixture be a solution. The paste-like vehicle can be cloudy and contain one or more phases with the disperse phase fine enough so that it will not separate substantially on standing.

The materials discussed in detail above are considered to be ingredients of the vehicles hereof.

THE METAL POWDER

Solder compositions useful herein as the metal powder for blending with the above described vehicles to form a paste, or for extrusion of a hollow wire for making a cored solder wire, are well known. A number of representative compositions useful herein are given in the Taylor et al article, supra. In general the solder compositions have a melting point in the range of from about 118° C. to about 330° C. and comprise tin together with lead and/or silver. Other metals such as zinc, aluminum, bismuth, cadmium, nickel, indium and cadmium may also be used in the solder compositions.

For making a solder paste, the metal powder is comminuted so that it is easily and stably dispersed in the vehicle by grinding, ball milling, paddle blending, ribbon blender, etc. The entire powder should pass through a 50 mesh screen (U.S. Sieve Series) (297 microns). Typically, the powder is finer than 100 mesh (149 microns) because larger particles are difficult to disperse and maintain in suspension in the paste. A particle size in the range of −200+400 mesh (U.S. Sieve Series) is preferred. Even smaller particle sizes, i.e., 10 microns or less are desired where normally liquid hydrocarbons are used in the vehicle as in silk screening paste compositions. For most purposes, from 3 to 20 parts by weight of solder metal powder is blended with 1 part by weight of vehicle. The paste compositions hereof generally will have a viscosity in the range of 20,000 cps to 200,000 cps. The preferred apparent viscosity will depend on the method of dispensing or application of the solder paste to the materials to be joined. Hand trowelling pastes are more satisfactory at the higher apparent viscosities than pastes intended for automatic dispensing such as extruding, flowing or spraying onto a substrate or those which are most suited for application to a substrate, e.g., a printed circuit, by a screen printed process. Viscosity can be controlled easily by the amount of solvent or solvent mixture and/or plasticizer employed in the vehicle, or by the vehicle to powder ratio. Pastes often are degassed at reduced pressure.

In fabricating cored solder wire, conventional procedures are used substituting a vehicle of the present invention for a conventional core composition such as a rosin based paste.

Effective control of hot slump in solder pastes is demonstrated by the following specific examples. These examples are intended to enable those skilled in the art to apply the principles of this invention in practical embodiments, but are not intended to limit the scope of the invention. In this specification all temperatures are in degrees Celsius unless otherwise stated, all parts, percentages, and ratios are by weight unless otherwise expressly stated, and sieve sizes are for the U.S. Standard Sieve series.

Testing for resistance to hot slump of a solder paste was done by applying a deposit of the paste (about 5 mm diameter by 4–5 mm high) by spatula to a copper coupon, then gradually and automatically warming the coupon with a Browne Corporation reflow instrument (in effect an automated travelling hot plate) from room temperature to 330° in about a half-minute to a minute. The thus-heated deposit was observed visually for collapse of the metal prior to its fusing as the vehicle disappeared therefrom. Significant collapse of particulate metal of the deposit prior to its fusion would indicate hot slump. None of the exemplary pastes given below showed significant hot slump. In the case of solder paste the spreading of molten metal from the deposit area was also observed in the same test. None of the exemplary tin-containing solder pastes given below showed significant spreading over the coupon; all had desirably restricted flow. Great spreading away from the locus of application is undesirable for many applications such as soldering in the manufacture of electronic devices.

In the examples the petrolatum indicated as Petrolatum A was Vaseline brand petroleum jelly, Vaseline being the trademark of Chesebrough Manufacturing Co., Inc. for USP petrolatum sold at retail for household use. The other petrolatums used were Penreco USP petrolatums, Penreco being the trademark of Pennzoil Co.; Petrolatum B was their Regent grade white petrolatum (Melting Point 118°–130° F.); Petrolatum C was their Royal grade (Melting pont 118°–130° F.); and Petrolatum D was their Amber grade (Melting Point 122°–135° F.).

In the following examples the following designations have the following identities:

| | |
|---|---|
| Triton* N-60 = | alpha-(nonylphlenyl)-omega-hydroxy-poly(oxy-1,2-ethanediyl), (Registry No.: 9016-45-9). |
| *The trademark of Rohm & Haas Company | |
| Armeen* HT = | bis(hydrogenated tallow alkyl)amine. |
| Armeen* RC = | bis($C_{14}$–$C_{16}$hydrocarbon alkyl)amine. |
| Duomeen* T = | N—tallow trimethylene diamine, and |
| Duomeen* TDO = | N—tallow trimethylene diamino dioleate, respectively. |
| *The trademarks of Akzona, Inc. | |
| PEG* 6000 DS = | alpha-(1-oxooctadecyl)-omega-[(1-oxo-octadecyl)oxy]poly(oxy-1,2-ethanediyl), (Reg. No.: 9005-08-07), |
| PEG* 6000 = | alpha-hydro-omega-hydroxy-poly(oxy-1,2-ethanediyl), Reg. No.: 25322-68-3, |
| Carbowax* 3350 = | a polyoxyethylenic wax, |
| n-Hexyl Carbitol* = | diethylene glycol mono n-hexyl ether, and |
| Butyl Carbitol* = | diethylene glycol monobutyl ether, respectively. |
| *The trademarks of Union Carbide Corp. | |
| Fluorad* = FC-340 | a liquid fluorocarbon. |
| *The trademark of 3M Company | |
| Surfynol* = 104E | 5-decyne-4,7-diol,2,4,7,9-tetramethyl, Reg. No.: 126-86-3. |
| *The trademark of Air Products and Chemicals, Inc. | |
| Dowanol* DM = | 2-(2-methoxyethoxy)ethanol, (Reg. No. 111-77-3), and |
| Dowanol* DE = | 2-(2-ethoxyethoxy)ethanol, (Reg. No. 111-90-0), respectively. |
| *The trademarks of Dow Chemical Company | |

Pastes tabulated below were made by blending the noncorrosive fluxing ingredients, metal powder and other solderability ingredients with petroleum hydrocarbon in a molten condition, then blending in the other vehicle ingredients when the mass cooled to 32°. The specification for the solder powders was 5% max. +200 mesh, 4% max. −325 mesh. The formulations were evaluated according to standards established for electronic grade solder pastes. Accordingly, although some of the exemplified pastes may not have met all the electronic grade criteria, they were operative for other utilizing such as for making a joint using a trowel to apply the paste. Of the exemplified solder pastes, those preferred for microelectronics work showed no solder balling.

In the solder tests no spattering was observed during heating to effect melting, and no significant hot slump or solder spreading was observed that is, they had good restriction of flow. Furthermore, there was no dewetting in evidence on the copper substrate, and cleaning of a joint easily could be had with a suitable organic solvent, e.g., a petroleum naphtha, alcohol, etc.

By way of contrast 20 parts of a prior art fluxing composition (specifically that of Example 1 of U.S. Pat. No. 3,925,112, which patent discloses some petrolatum as one of the ingredients in the oily phase of an aqueous soldering flux emulsion) was compounded with 80 parts of solder alloy powder herein exemplified in the same manner as the pastes herein exemplified; resistance to hot slump was not demonstrated nor was restricted flow (spreading) of melted solder, and there was considerable spattering.

| Alloy Powder: 97.5 Pb/1 Sn/1.5 Ag | | | | | | | |
|---|---|---|---|---|---|---|---|
| Example No. | 1 | 2 | 3 | 4 | 5 | 6 | 7 |
| % Metal | 80.0 | 85.0 | 85.0 | 85.0 | 85.0 | 93.0 | 93.0 |
| Components | | | | | | | |
| Petrolatum A | 12.3 | 10.5 | 10.5 | 10.5 | 10.5 | 5.0 | 5.0 |
| Triethanolamine | 6.2 | 3.7 | 3.7 | 3.7 | 3.7 | 2.0 | |
| 7% parts NaOH dissolved in 93 parts Glycerine | 1.4 | | | | | | |
| Triton N-60 | 0.1 | | | | | | |
| Armeen HT | | | | 0.8 | | | 2.0 |
| Armeen RC | | 0.8 | | | | | |
| Duomeen T | | | 0.8 | | | | |
| Duomeen TDC | | | | | 0.8 | | |
| Example No. | 8 | 9 | 10 | 11 | 12 | 13 | 14 |
| % Metal | 85.0 | 85.0 | 90.0 | 85.0 | 85.0 | 85.0 | 85.0 |
| Components | | | | | | | |
| Petrolatum A | 8.0 | 10.0 | 5.6 | | | | 12.0 |
| Triethanolamine | 1.9 | 1.0 | 3.3 | 5.0 | 5.0 | 5.0 | 2.7 |
| Glycerine | 0.4 | 0.2 | 0.5 | 0.8 | 0.8 | 0.8 | |
| Cholic Acid | 1.4 | 1.5 | 0.6 | 0.9 | 0.9 | 0.9 | 0.3 |
| PEG 6000 | 1.9 | 0.8 | | | | | |
| n-Hexyl Carbitol | 1.4 | 1.5 | | | | | |
| Petrolatum B | | | | 8.3 | | | |
| Petrolatum C | | | | | 8.3 | | |
| Petrolatum D | | | | | | 8.3 | |
| Example No. | 15 | 16 | 17 | 18 | 19 | 20 | 21 |
| % Metal | 93.0 | 93.0 | 93.0 | 93.0 | 93.0 | 93.0 | 93.0 |
| Components | | | | | | | |
| Petrolatum A | 3.9 | 5.0 | 5.0 | 5.0 | 3.9 | 3.9 | 3.9 |
| Triethanolamine | 1.6 | 1.0 | | | 1.6 | 1.6 | 2.3 |
| 7 parts NaOH dissolved in 93 parts Glycerine | | | | | 1.5 | | 0.8 |
| Armeen HT | 1.5 | 1.0 | | | | | |
| Ascorbic Acid | | | 2.0 | | | | |
| Stearic Acid | | | | 2.0 | | 1.5 | |
| Example No. | 22 | 23 | 24 | 25 | 26 | 27 | 28 |
| % Metal | 93.0 | 85.0 | 85.0 | 85.0 | 85.0 | 85.0 | 85.0 |
| Components | | | | | | | |
| Petrolatum A | 3.9 | 8.3 | 8.3 | | | | 8.3 |
| Triethanolamine | 2.3 | 5.0 | 5.0 | 5.0 | 5.0 | 5.0 | 3.3 |
| 7 parts NaOH dissolved in 93 parts Glycerine | | 1.7 | | | | | |
| Stearic Acid | 0.8 | | | | | | |
| Glycerine | | | 1.1 | 0.8 | 0.8 | 0.8 | 1.7 |
| Cholic Acid | | | 0.6 | 0.9 | 0.9 | 0.9 | 1.7 |
| Pine Oil | | | | | | | |
| Petrolatum B | | | | 8.3 | | | |
| Petrolatum C | | | | | 8.3 | | |
| Petrolatum D | | | | | | 8.3 | |
| Example No. | 29 | 30 | 31 | 32 | 33 | 34 | 35 |
| % Metal | 85.0 | 85.0 | 85.0 | 85.0 | 85.0 | 90.0 | 90.0 |
| Components | | | | | | | |
| Petrolatum A | 8.3 | 8.6 | 11.3 | 11.0 | 10.5 | 5.0 | 5.0 |
| Triethanolamine | 5.7 | 3.3 | 3.4 | 3.7 | 4.2 | 3.8 | 3.8 |
| Glycerine | 0.5 | | | | | | |
| Cholic Acid | 0.5 | 1.5 | 0.3 | 0.3 | 0.3 | 0.2 | 0.2 |
| Pine Oil | | 1.6 | | | | | |
| Butyl Carbitol | | | | | | | 1.0 |
| Di-n-butyl Phthalate | | | | | | 1.0 | |
| Alloy Powder: 10 Sn/88 Pb/2 Ag | | | | | | | |
| Example No. | 36 | 37 | 38 | 39 | 40 | 41 | 42 |

-continued

| | | | | | | | |
|---|---|---|---|---|---|---|---|
| % Metal | 85.0 | 85.0 | 85.0 | 85.0 | 85.0 | 85.0 | 85.0 |
| Components | | | | | | | |
| Petrolatum A | 6.8 | 7.4 | 6.8 | 7.4 | 6.8 | 6.7 | 7.0 |
| Triethanolamine | 6.0 | 6.4 | 6.0 | 6.4 | 5.2 | 6.6 | 6.4 |
| Cholic Acid | 1.1 | 1.2 | 1.5 | | 2.2 | 0.9 | 0.4 |
| Glycerine | 1.03 | | 0.7 | 1.2 | 0.8 | 0.8 | 0.6 |
| NaOH | 0.07 | | | | | | |
| Example No. | 43 | 44 | 45 | 46 | 47 | 48 | 49 |
| % Metal | 85.0 | 85.0 | 85.0 | 85.0 | 88.0 | 88.0 | 90.0 |
| Components | | | | | | | |
| Petrolatum A | 11.2 | 11.2 | 7.0 | 12.0 | 9.0 | 9.6 | 7.5 |
| Triethanolamine | 2.3 | 3.4 | 6.5 | 2.7 | 2.8 | 2.2 | 2.3 |
| Cholic Acid | | 0.4 | 0.3 | 0.3 | 0.2 | 0.2 | 0.2 |
| Glycerine | 1.2 | | 1.2 | | | | |
| NaOH | 0.3 | | | | | | |
| Example No. | 50 | 51 | 52 | 53 | 54 | 55 | 56 |
| % Metal | 94.0 | 85.0 | 90.0 | 90.0 | 90.0 | 90.0 | 90.0 |
| Components | | | | | | | |
| Petrolatum A | 4.5 | 12.0 | 7.2 | 7.0 | 7.1 | 6.8 | 6.8 |
| Triethanolamine | 1.4 | 2.7 | 2.6 | 2.0 | 2.3 | 2.0 | 2.5 |
| Cholic Acid | 0.1 | 0.3 | 0.2 | 0.2 | 0.2 | 0.2 | 0.2 |
| Surfynol 104E | | | | 0.8 | 0.4 | 1.0 | 0.5 |
| Example No. | 57 | 58 | 59 | 60 | 61 | 62 | 63 |
| % Metal | 90.0 | 90.0 | 85.0 | 85.0 | 85.0 | 85.0 | 90.0 |
| Components | | | | | | | |
| Petrolatum A | 6.5 | 6.2 | 13.5 | 10.5 | 9.0 | 8.3 | 6.4 |
| Triethanolamine | 2.5 | 2.8 | 1.2 | 4.2 | 4.5 | 5.2 | 2.4 |
| Cholic Acid | 0.2 | 0.2 | 0.3 | 0.3 | 0.3 | 0.3 | 0.2 |
| Surfynol 104E | | | | | | | 0.1 |
| Di-n-butyl Phthalate | 0.8 | 0.8 | | | 1.2 | 1.2 | 0.9 |
| Alloy Powder: 62 Sn/36 Pb/2 Ag | | | | | | | |
| Example No. | 64 | 65 | 66 | 67 | 68 | 69 | 70 |
| % Metal | 85.0 | 85.0 | 85.0 | 85.0 | 85.0 | 85.0 | 85.0 |
| Components | | | | | | | |
| Petrolatum A | 8.3 | 8.3 | | | | | |
| Triethanolamine | 5.0 | 5.0 | 6.8 | 6.7 | 5.2 | 5.2 | 6.0 |
| 7 parts NaOH dissolved in 93 parts Glycerine | 1.7 | | | | | | |
| Cholic Acid | | 1.7 | 1.5 | 0.8 | 0.8 | 1.5 | 1.1 |
| Glycerine | | | 1.5 | 0.7 | 0.7 | 1.5 | 1.1 |
| Petrolatum C | | | 5.2 | 6.8 | 8.3 | 6.8 | 6.8 |
| Example No. | 71 | 72 | 73 | 74 | 75 | 76 | |
| % Metal | 85.0 | 85.0 | 85.0 | 85.0 | 85.0 | 85.0 | |
| Components | | | | | | | |
| Petrolatum A | | | | 9.0 | 6.0 | 12.0 | |
| Triethanolamine | 3.7 | 1.5 | 6.8 | 6.0 | 9.0 | 2.7 | |
| Cholic Acid | 2.3 | 3.0 | | | | | |
| Glycerine | 2.2 | 3.0 | | | | | |
| Petrolatum C | 6.8 | 7.5 | 8.2 | | | | |
| Example No. | 77 | 78 | 79 | 80 | 81 | 82 | 83 |
| % Metal | 85.0 | 85.0 | 85.0 | 85.0 | 85.0 | 85.0 | 85.0 |
| Components | | | | | | | |
| Petrolatum A | 7.5 | 9.0 | 7.5 | 8.2 | 4.5 | 6.0 | 7.5 |
| Triethanolamine | 7.2 | 5.2 | 7.5 | 5.4 | 5.3 | 4.5 | 3.8 |
| 7 parts NaOH dissolved in 93 parts Glycerine | | | | | 5.2 | 4.5 | 3.7 |
| Cholic Acid | 0.3 | | | | | | |
| Glycerine | | 0.8 | | 1.4 | | | |
| Example No. | 84 | 85 | 86 | 87 | 88 | 89 | 90 |
| % Metal | 85.0 | 85.0 | 85.0 | 85.0 | 85.0 | 85.0 | 85.0 |
| Components | | | | | | | |
| Petrolatum A | 7.5 | 4.5 | 8.5 | 9.5 | 11.0 | 13.0 | 8.5 |
| Triethanolamine | 3.8 | 3.8 | 2.5 | 1.3 | 1.3 | 1.0 | 4.6 |
| 7 parts NaOH dissolved in 93 parts Glycerine | 3.7 | 3.7 | 2.5 | 1.2 | 1.2 | 1.0 | 1.6 |
| Cholic Acid | | | | | | | 0.3 |
| Beta-Alanine | | 3.0 | 1.5 | 3.0 | 1.5 | | |
| Example No. | 91 | 92 | 93 | 94 | 95 | 96 | 97 |
| % Metal | 85.0 | 85.0 | 85.0 | 85.0 | 85.0 | 85.0 | 85.0 |
| Components | | | | | | | |
| Petrolatum A | 12.3 | 12.3 | 12.3 | 12.3 | 12.3 | 12.1 | 11.8 |

-continued

| | | | | | | | |
|---|---|---|---|---|---|---|---|
| Triethanolamine | 1.1 | 0.9 | 0.9 | 0.9 | 1.1 | 1.1 | 1.1 |
| 7 parts NaOH dissolved in 93 parts Glycerine | 1.1 | 0.9 | 0.9 | 0.9 | 1.1 | 1.1 | 1.1 |
| Butylcarbitol | 0.5 | 0.9 | | | 0.5 | 0.7 | |
| Dowanol DM | | | 0.9 | | | | |
| Dowanol DE | | | | 0.9 | | | |
| Terpineol | | | | | | | 1.0 |

| Example No. | 98 | 99 | 100 | 101 | 102 | 103 |
|---|---|---|---|---|---|---|
| % Metal | 90.0 | 85.0 | 85.0 | 85.0 | 85.0 | 85.0 |
| Components | | | | | | |
| Petrolatum A | 7.8 | 10.6 | 10.6 | 11.7 | 11.6 | 11.5 |
| Triethanolamine | 1.6 | 1.5 | 1.5 | 0.5 | 0.5 | 0.5 |
| 7 parts NaOH dissolved in 93 parts Glycerine | 0.6 | 1.4 | 1.5 | 0.5 | 0.5 | 0.5 |
| Butylcarbitol | | 1.3 | 1.2 | 1.0 | 1.0 | 1.0 |
| Carbowax 3350 | | 0.2 | 0.2 | 0.3 | 0.4 | 0.5 |

Alloy Powder: 96.5 Sn/3.5 Ag

| Example No. | 104 | 105 | 106 | 107 |
|---|---|---|---|---|
| % Metal | 80.0 | 80.0 | 80.0 | 80.0 |
| Components | | | | |
| Petrolatum A | 16.0 | 16.4 | 16.4 | 15.3 |
| Triethanolamine | 3.6 | 3.6 | 3.6 | 3.5 |
| Cholic Acid | 0.4 | | | 0.4 |
| Butyl Carbitol | | | | 0.7 |
| 10% Florad FC 14 in Butyl Carbitol | | | | 0.1 |

Alloy Powder: 63 Sn/37 Pb

| Example No. | 108 | 109 | 110 | 111 | 112 | 113 | 114 |
|---|---|---|---|---|---|---|---|
| % Metal | 85.0 | 85.0 | 85.0 | 85.0 | 85.0 | 85.0 | 85.0 |
| Components | | | | | | | |
| Petrolatum A | 8.3 | 8.3 | 8.3 | 8.3 | 8.3 | 8.3 | 8.3 |
| Triethanolamine | 5.0 | 5.0 | 3.3 | 6.7 | 1.7 | 5.7 | 1.7 |
| 7 parts NaOH dissolved in 93 parts Glycerine | 1.7 | | | | | | |
| Glycerine | | | | | 5.0 | 1.0 | 1.3 |
| Cholic Acid | | 1.7 | 3.4 | | | | 1.2 |
| PEG 6000 | | | | | | | 2.5 |

| Example No. | 115 | 116 | 117 | 118 | 119 | 120 | 121 |
|---|---|---|---|---|---|---|---|
| % Metal | 85.0 | 85.0 | 85.0 | 85.0 | 85.0 | 85.0 | 85.0 |
| Components | | | | | | | |
| Petrolatum A | 10.0 | 6.8 | 4.5 | 6.0 | 7.5 | 6.0 | 4.5 |
| Triethanolamine | 1.0 | 6.0 | 5.3 | 4.5 | 3.8 | 3.8 | 3.8 |
| 7 parts NaOH dissolved in 93 parts Glycerine | | | 5.2 | 4.5 | 3.7 | 3.7 | 3.7 |
| Glycerine | 1.5 | 1.1 | | | | | |
| Cholic Acid | 1.5 | 1.1 | | | | | |
| PEG 6000 | 1.0 | | | | | | |
| Beta Alanine | | | | | | 1.5 | 3.0 |

| Example No. | 122 | 123 | 124 | 125 | 126 | 127 | 128 |
|---|---|---|---|---|---|---|---|
| % Metal | 85.0 | 85.0 | 85.0 | 85.0 | 85.0 | 90.0 | 90.0 |
| Components | | | | | | | |
| Petrolatum A | 8.5 | 9.5 | 11.0 | 13.0 | 11.8 | 6.2 | 6.5 |
| Triethanolamine | 2.5 | 1.3 | 1.3 | 1.0 | 1.1 | 1.4 | 2.5 |
| 7 parts NaOH dissolved in 93 parts Glycerine | 2.5 | 1.2 | 1.2 | 1.0 | 1.1 | 1.4 | |
| Glycerine | | | | | | | |
| Cholic Acid | | | | | | | 0.2 |
| PEG 6000 | | 3.0 | 1.5 | | | | |
| Beta Alanine | 1.5 | | | | 1.0 | 0.6 | |
| Butylcarbitol | | | | | | | 0.8 |
| Di-n-butyl-Phthalate | | | | | | 0.4 | |

| Example No. | 129 | 130 |
|---|---|---|
| % Metal | 90.0 | 90.0 |
| Petrolatum A | 9.7 | 10.0 |
| Triethanolamine | 3.8 | 3.7 |
| Glycerine | | 0.2 |
| Cholic Acid | 0.3 | 0.1 |
| Butylcarbitol | 1.2 | |

Alloy Powder: 97.5 Pb/1 Sn/1.5 Ag

-continued

| Example No. | 131 |
|---|---|
| % Metal Powder | 85.0 |
| Petrolatum A | 6.0 |
| Carbowax 3350* | .6 |
| Tetraethylene glycol | 0.0 |
| Butyl Carbitol** | 1.92 |
| Triethanolamine | 3.75 |
| 7 parts NaOH dissolved in 93 parts glycerine | 0.0 |
| Surfynol 104E*** | 0.0 |
| Floral A**** | 2.73 |

*Poly(oxy-1,2-ethandiyl),alpha-hydro-omega-hydroxy. (Reg. No.: 25322-68-3).
**2-(butoxyethoxy)ethanol. (Reg. No.: 112-34-5).
***2,4,7,9-tetramethyl-5-decene-4,7-diol. (Reg. No.: 126-86-3).
****Floral AK = hydrogenated wood rosin.

Accordingly, it should be evident that one skilled in the art of formulating soft solder metal powder-bearing pastes now has a way for: controlling hot slump to a user's desired specification by formulating for diminishing such slump modestly or even clear down to practically zero; and for imparting, where necessary or desired, restriction of flow of the molten metal anywhere from a modest desired proportion down to insignificance. The combination in the instant vehicle of hydrocarbon/antislump agent-flux system as defined herein provides such control. Examples 108, 125 and 131 represent "best modes" of carrying out this invention, each being commercial embodiments of the present invention.

What is claimed is:

1. A nonaqueous noncorrosive inorganic salt free powdered metal soft solder paste composition containing from 75% to 95% by weight of a powdered soft solder metal or powdered soft solder metal alloy having an average particle size finer than 100 mesh (U.S. Standard Sieve Size) and *a vehicle containing* from [5% to 25] *0.5% to 75%* by weight *of said vehicle* of a nonaqueous organic liquid having a surface tension of from 43 to 65 or more dynes/cm. at 20° C., and a noncorrosive anhydrous flux.

2. An improved essentially nonaqueous noncorrosive inorganic saltfree paste vehicle for soft solder metal powder, said vehicle comprising petrolatum in which is dispersed in a proportion effective for diminishing hot slump of said metal powder when it is compounded with said vehicle, a nonaqueous organic liquid, having a surface tension of from 43 to 65 or higher dynes/cm. at 20° C., and a noncorrosive anhydrous flux.

3. An improved essentially nonaqueous noncorrosive inorganic salt free paste vehicle for soft solder metal powder, said vehicle comprising petrolatum in which is dispersed in a proportion effective for diminishing hot slump of said metal powder when it is compounded with said vehicle, a base dispersed in a liquid polyol said polyol having a surface tension of from 43 to 65 or higher dynes/cm. at 20° C., and a noncorrosive anhydrous flux.

4. A nonaqueous noncorrosive inorganic salt free powdered soft solder metal paste composition in accordance with claim 1 wherein the nonaqueous organic liquid is triethanolamine.

5. An nonaqueous noncorrosive inorganic salt free powdered soft solder metal paste composition in accordance with claim 1 wherein the nonaqueous organic liquid is diethanolamine.

6. The vehicle of claim 3 in which said base is an amino alcohol in a proportion between about 2% and about 40%.

7. The vehicle of claim 6 in which said base is an amino alkane in a proportion between about 2% and about 40%.

8. The vehicle of claim 3 in which the base is sodium hydroxide in a proportion between about 0.05% and about 5%.

9. The paste of claim 1 comprising from about 79–95 parts of powdered tin-containing solder which melts below 330° C. and has a particle size not substantially larger than about 100 mesh.

10. The vehicle of claim 1 which consists essentially of petrolatum, an base and a polyol having a surface tension of from 43 to 65 or more dynes/cm. at 20° C. and is further characterized by the presence therein of a surfactant.

11. The vehicle of claim 1 which consists essentially of petrolatum, an alkali metal hydroxide and a polyol having a surface tension of from 43 to 65 or more dynes/cm. at 20° C. and is further characterized by the presence therein of plasticizer or diluent.

12. The vehicle of claim 11 wherein at least a portion of said diluent is practically water insoluble.

13. The vehicle of claim 12 wherein said diluent comprises a phthalate ester.

14. The vehicle of claim 13 wherein said ester is dibutyl phthalate.

15. The vehicle of claim 11 wherein said diluent comprises a terpene alcohol.

16. The vehicle of claim 3 compounded for use with soft solder powder wherein said base is an amine and the vehicle also contains carboxylic acid.

17. The vehicle of claim 16 wherein said carboxylic acid is polycyclic.

18. The vehicle of claim 17 wherein said carboxylic acid is cholic acid.

19. The vehicle of claim 17 wherein said carboxylic acid is a rosin acid.

20. The vehicle of claim 19 wherein said rosin acid is principally abietic acid.

21. The vehicle of claim 20 wherein said amine comprises a water soluble alkanolamine.

22. The vehicle of claim 21 wherein said alkanolamine is triethanolamine.

23. The vehicle of claim 16 wherein said alkali comprises triethanolamine, said carboxylic acid is cholic acid, and the vehicle is further characterized by the presence of surfactant and di-n-butyl phthalate diluent.

24. The vehicle of claim 2 wherein said liquid polyol comprises glycerine.

25. A nonaqueous noncorrosive inorganic salt free soft solder paste characterized by resistance to slumping during heating to the solder fusion point comprising:

(a) from 75 to 95 weight parts per 100 parts of paste composition of a soft solder metal powder composition having a particle size of from −200 to +400 mesh (U.S. Standard Screen), (b) from 25 to 5 weight parts heat liquefiable hydrocarbon ranging from semi-solid at room temperature to fugitive from the metal powder at the fusion temperature thereof, (c) a nonaqueous organic liquid having a surface tension of from 44 to 65 dynes/cm. at 20° C. dispersed in said hydrocarbon, and, (d) an amount of a noncorrosive flux for said soft solder sufficient to form a shiny and coherent residue of solder upon melting and solifying said powdered soft solder.

26. A nonaqueous noncorrosive inorganic salt free soft solder paste as defined in claim 25 wherein the flux is a basic reacting flux.

27. A nonaqueous noncorrosive inorganic salt free soft solder paste as defined in claim 26 wherein the basic reacting flux ia an amine.

28. A nonaqueous noncorrosive inorganic salt free soft solder paste as defined in claim 27 wherein the amine is a trialkylamine in which the alkyl group is selected from the same or different alkyl groups containing from 2 to 6 carbon atoms.

29. A nonaqueous noncorrosive inorganic salt free soft solder paste as defined in claim 28 in which the trialkylamine is triethylamine.

30. A nonaqueous noncorrosive inorganic salt free soft solder paste as defined in claim 25 in which the flux is an alkali metal hydroxide or an alkali metal alcoholate.

31. A nonaqueous noncorrosive inorganic salt free soft solder paste as defined in claim 30 in which the alkali metal hydroxide is dissolved in or reacted with the polyol.

32. A nonaqueous noncorrosive inorganic salt free soft solder paste as defined in claim 30 in which the alkali metal hydroxide is sodium hydroxide.

33. A nonaqueous noncorrosive inorganic salt free soft solder paste as defined in claim 25 in which the nonaqueous organic liquid is polyhydric alcohol containing only the elements C, H, and O.

34. A nonaqueous noncorrosive inorganic salt free soft solder paste as defined in claim 33 in which the polyhydric alcohol is glycerine.

35. A nonaqueous noncorrosive inorganic salt free soft solder paste as defined in claim 34 wherein the flux is an alkali metal hydroxide or alcoholate.

36. A nonaqueous noncorrosive inorganic salt free soft solder paste as defined in claim 25 said paste being further characterized by the presence therein of from 0.5% to 10% by weight of an alkanolamine.

37. A nonaqueous noncorrosive inorganic salt free soft solder paste as defined in claim 26 wherein the alkanolamine is triethanolamine.

38. The composition of claim 30 in which the alkali is sodium hydroxide in a proportion between about 0.05% and about 5%.

39. The paste of claim 25 comprising from about 75–95 parts of powdered tin-containing solder which melts below 330° C. and has particle size not substantially larger than about 100 mesh.

40. The paste of claim 31 which consists essentially of petrolatum and said alkali and is characterized by the presence therein of surfactant.

41. The paste of claim 31 which consists essentially of petrolatum and said alkali and is characterized by the presence therein of plasticizer or solvent diluent.

42. The paste of claim 41 wherein at least a portion of said diluent is water insoluble.

43. The paste of claim 42 wherein said diluent comprises a phthalate ester.

44. The paste of claim 43 wherein said ester is dibutyl phthalate.

45. The paste of claim 41 wherein said diluent comprises a terpene alcohol.

46. The paste of claim 25 which is further characterized by the presence therein of a carboxylic acid.

47. The paste of claim 46 wherein said carboxylic acid is polycyclic.

48. The paste of claim 46 wherein said carboxylic acid is cholic acid.

49. The paste of claim 46 wherein said carboxylic acid is a resin acid.

50. The paste of claim 46 wherein said resin acid is principally abietic acid.

51. The paste of claim 40 which is further characterized by the presence of alkanolamine.

52. The paste of claim 51 wherein said alkanolamine is triethanolamine.

53. The paste of claim 39 wherein said alkali comprises sodium hydroxide and glycerine, said carboxylic acid is cholic acid, and the vehicle is further characterized by the presence of surfactant and di-n-butyl phthalate diluent.

54. The paste of claim 25 wherein said polyol is glycerine.

55. The paste of claim 25 wherein the flux/nonaqueous organic liquid system is 7% sodium hydroxide dissolved in 93% glycerine.

56. The paste of claim 51 wherein the alkanolamine is monoethanolamine.

57. The paste of claim 25 wherein the hydrocarbon is a hydrogenated polymeric hydrocarbon having a softening point in the range of 15° to 130° C.

* * * * *